United States Patent [19]
Le Devehat

[11] Patent Number: 5,035,021
[45] Date of Patent: Jul. 30, 1991

[54] SCRAPER FOR LIQUID DISTRIBUTION PIPES, ESPECIALLY FOR PETROLEUM PRODUCTS

[75] Inventor: Eugene Le Devehat, Saligny, France
[73] Assignee: FMC Corporation, Chicago, Ill.
[21] Appl. No.: 454,092
[22] Filed: Dec. 20, 1989
[30] Foreign Application Priority Data
Dec. 20, 1988 [FR] France .................. 88 16847
[51] Int. Cl.⁵ ........................................ B08B 9/02
[52] U.S. Cl. ............................. 15/104.061; 15/3.51
[58] Field of Search ............. 15/104.061, 104.062, 15/104.063, 3.5, 3.51

[56] References Cited
U.S. PATENT DOCUMENTS
451,841 5/1891 Platt et al. ................ 15/104.061
1,872,855 8/1932 Walker ..................... 15/104.061
2,332,984 10/1943 Brackeen .................. 15/104.061
2,402,796 6/1946 Wood ...................... 15/104.061

FOREIGN PATENT DOCUMENTS
2801378 7/1979 Fed. Rep. of Germany .................. 15/104.061
2612091 9/1988 France ..................... 15/104.061

Primary Examiner—Edward L. Roberts
Attorney, Agent, or Firm—W. William Ritt, Jr.; Richard B. Megley

[57] ABSTRACT

A pipeline scraper comprising an elongated body defined by two complementary parts that form end portions and a reduced cross-section central portion, two wear segments surrounding and mounted on the central portion adjacent the end portions, and threaded means releasably fastening the components together.

18 Claims, 3 Drawing Sheets

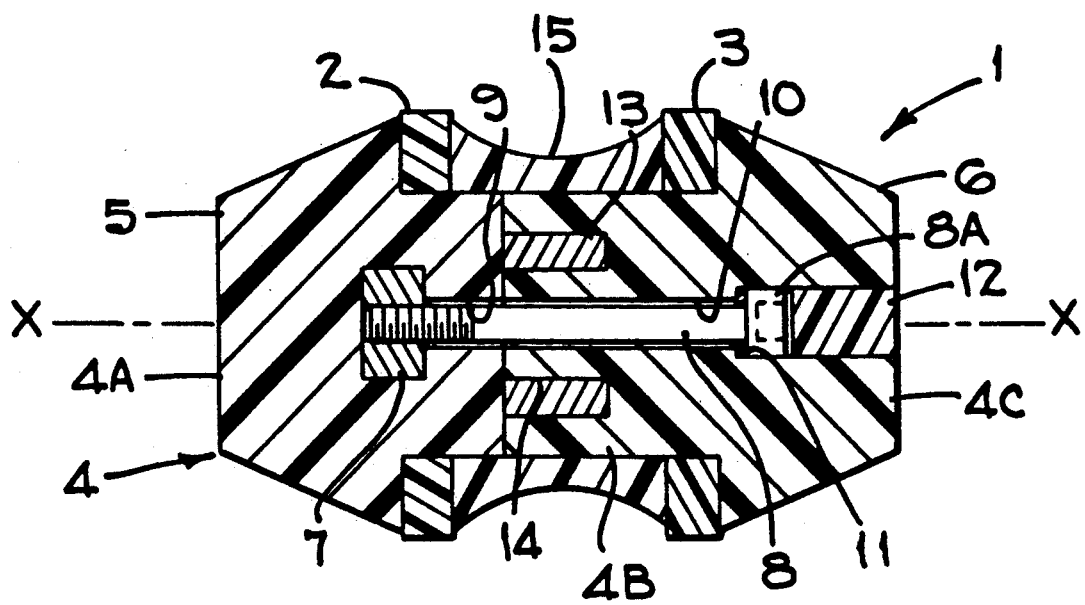
FIG_1
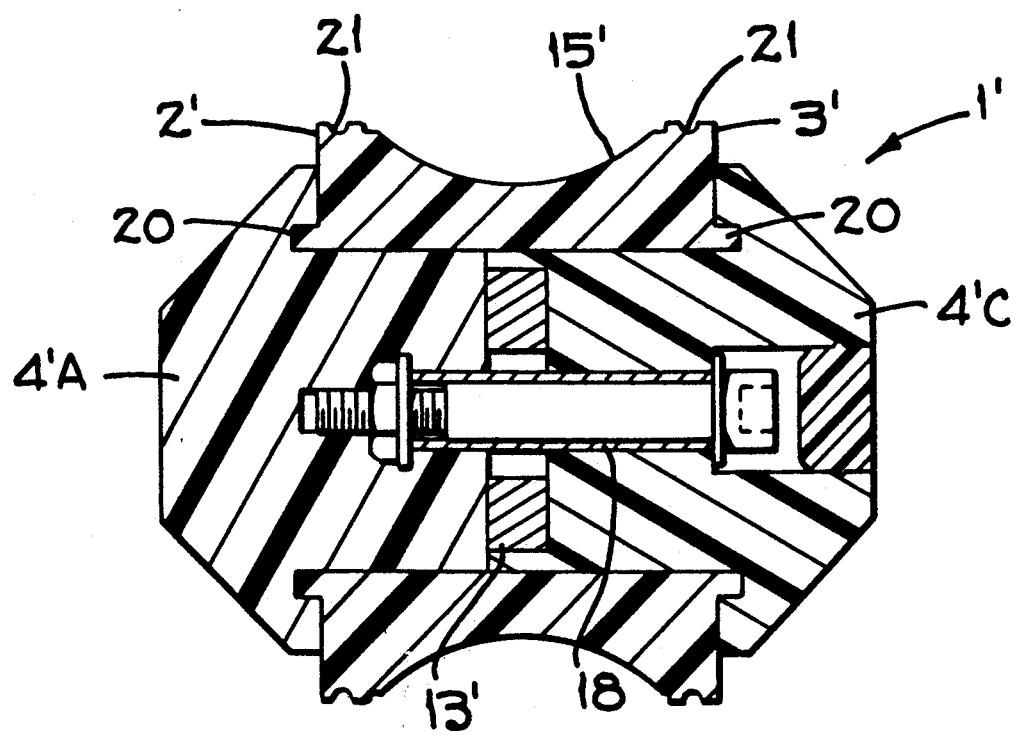
FIG_2

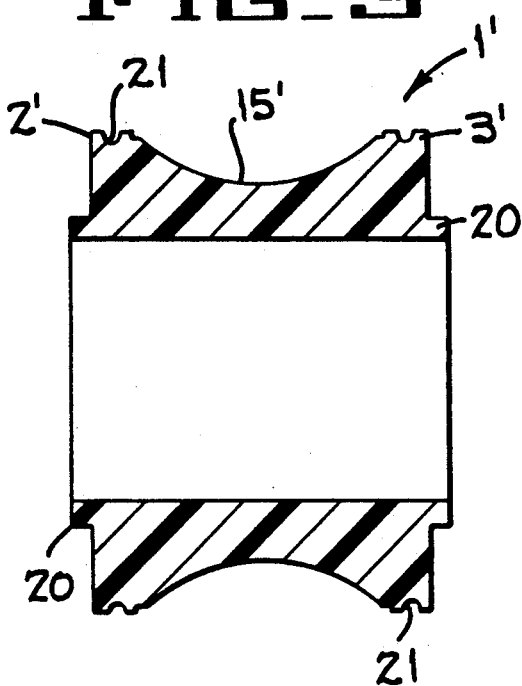
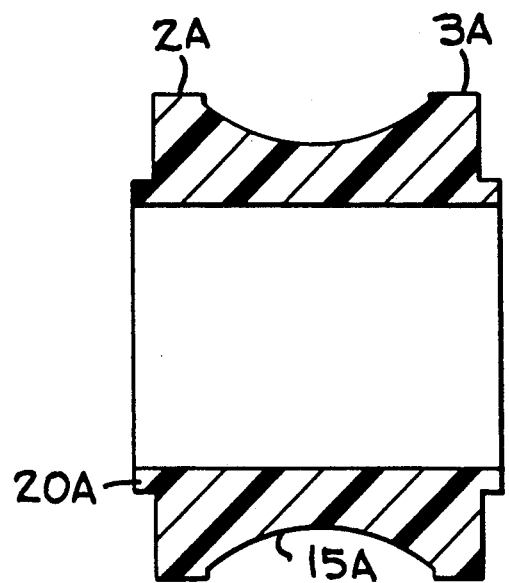
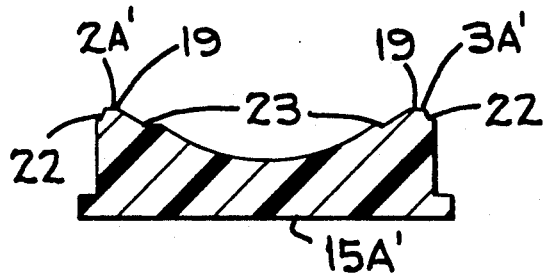
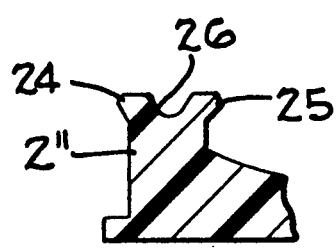
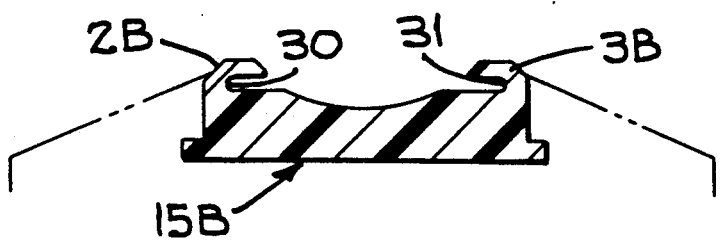

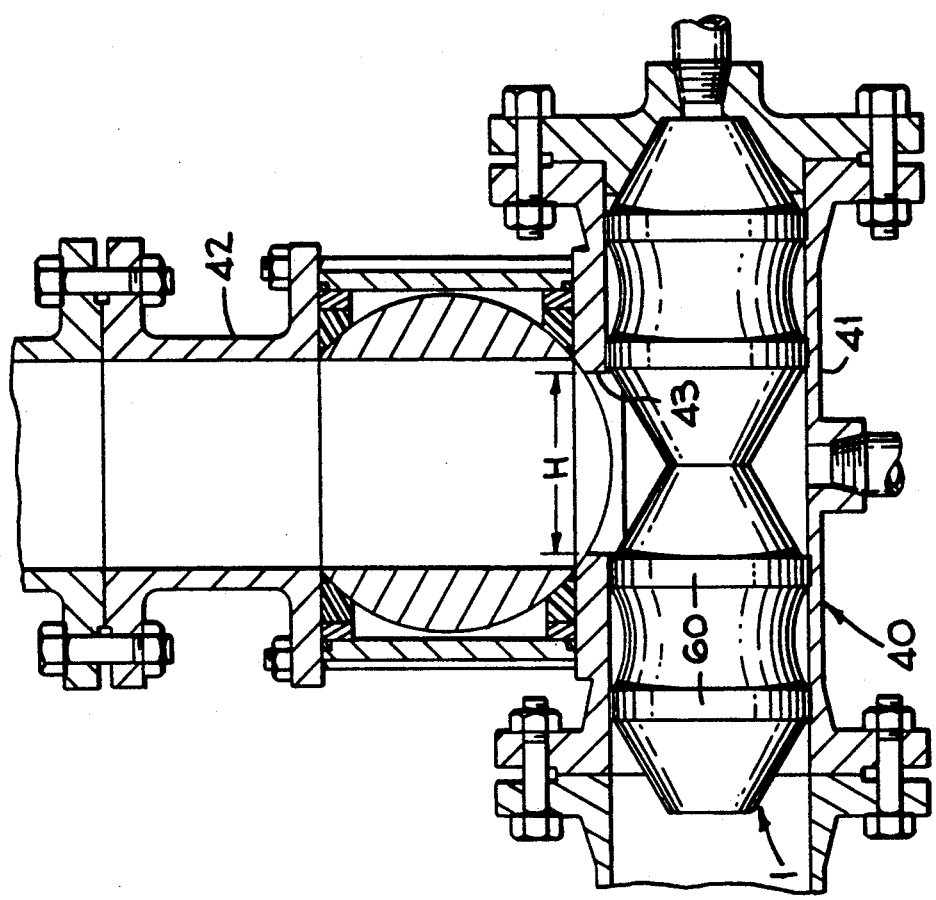
FIG_8
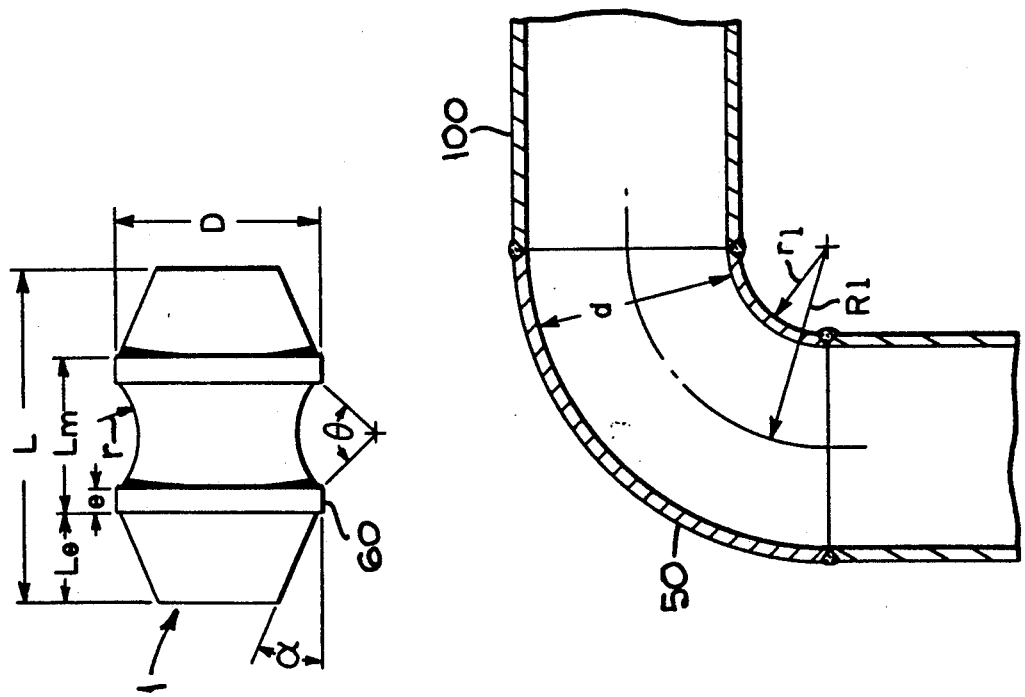
FIG_9

SCRAPER FOR LIQUID DISTRIBUTION PIPES, ESPECIALLY FOR PETROLEUM PRODUCTS

The present invention concerns a bidirectional scraper for constant cross-section liquid distribution pipes, for example pipes for distributing oil, petroleum products, foodstuff products or paint, etc.

If the same pipe is used to distribute several liquids in succession and it is required to change liquid, after shutting off the supply of the first liquid at the upstream end of the pipe and before establishing the supply of the next liquid, also at the upstream end of the pipe, it is known practice to circulate in the pipe from the upstream to the downstream end and vice versa a "captive" bidirectional scraper to sweep the interior wall of the pipe and discharge residues of the first liquid to the downstream end. The scraper also establishes a reliable separation between successive liquids so that contamination of one by the other is avoided.

This is described in particular in the document FR-2.222.587 and in the document DE-3.032.532.

Currently known scrapers, whether of the spherical or cylindrical type or the type with a separate outer ring, are made from an elastic material to allow for variations in the interior diameter of the pipe, due in particular to manufacturing tolerances, and to absorb the impacts that occur at the end of travel.

The parts of these scrapers which come into contact with the interior wall of the pipes with very limited clearance so as to detach from them the moist residues adhering to them are subject to considerable wear so that it is necessary to replace the scrapers frequently, used scrapers being scrapped in their entirety.

An object of the invention is to alleviate this disadvantage by enabling re-use of non-worn parts of the scrapers.

Furthermore, known scrapers do not include any means for guiding them round bends; what is more, when two scrapers butt against each other the area of contact between their rounded ends is very small, which can cause extremely localised wear and/or prevent precise relative positioning of two such scrapers in contact with each other.

In another aspect the invention proposes to alleviate these disadvantages.

To this end it proposes a bidirectional scraper for liquid distribution pipes comprising an elongate body with two end portions provided with two wear segments on either side of a thinner central portion with a concave external surface characterised in that the longate body is formed by two complementary parts attached to each other by a member forming a nut fastened to one of the parts and a member forming a bolt inserted into the other of the parts, the wear segments being removably mounted around a central portion of the body, axially between two end portions of the body.

In preferred embodiments of the invention, some of which may be combined with each other:

the wear segments are annular and held apart from each other by a separate sleeve disposed around the central portion;
the wear segments are fastened to a sleeve disposed around the central portion;
the wear segments incorporate a centering rib axially facing the end portions;
the removable wear segments have a smooth radially external surface;
the removable wear segments incorporate a bead flanked by two bevels projecting radially outwards;
the wear segments incorporate an annular groove open radially outwards;
the groove separates two beads forming scraper lips;
the segments incorprate cylindrical slots facing axially towards each other;
the end portions are frustoconical (which is novel in itself);
the half-angle $\alpha$ at the apex of the frustoconical portions is between 20° and 25°;
the length $L_e$ of the frustoconical portions is between 35% and 45% of the diameter D of the wear segments;
the distance $L_m$ between the frustoconical portions is substantially between 0.75 and 0.85 times the diameter D of the wear segments;
the length L of the scraper is substantially between 1.55 and 1.6 times the diameter D of the wear segments;
the thinner central portion has a radius of curvature r between 0.40 and 0.50 times the diameter D of the wear segments;
the nut and the bolt are isolated in a fluid-tight way from the exterior of said scraper;
it comprises substantially half-way along it a radially magnetised annular permanent magnet that is advantageously removable.

The invention is also directed to use of the scraper for scraping a pipe incorporating at least one bend with an average radius of curvature (R1) which is approximately equal to the outside diameter of the wear segments.

Objects, characteristics and advantages of the invention will emerge from the following description given by way of non-limiting example with reference to the appended drawings in which:

FIG. 1 is a view in cross-section of a scraper in accordance with the invention;
FIG. 2 is an alternative embodiment of it;
FIG. 3 is a view in axial cross-section of a sleeve from the scraper in FIG. 2;
FIG. 4 is a simplified variant of the sleeve from FIG. 3;
FIG. 5 is a partial view of another variant of the sleeve from FIG. 3;
FIG. 6 is a partial view of another variant of the sleeve from FIG. 3;
FIG. 7 is a partial view of another variant of the sleeve from FIG. 3; and
FIG. 8 is a view in cross-section of a pipe bend and a three-way value with the scraper from FIG. 1.
FIG. 9 is a diagrammatic view of the scraper of FIG. 1, with reference indicia for its various dimensions and surfaces.

FIG. 1 shows a solid, substantially rigid scraper 1 of elongate shape along an axis of symmetry X—X.

The scraper 1 comprises two annular wear segments 2 and 3 removably mounted on an elongate body 4 comprising a central portion 4B to which the wear segments 2 and 3 are fitted and two end portions 4A and 4C of the same shape.

The body is formed by two complementary parts 5 and 6 fixed to each other by a nut 7 trapped in one of the parts (5) and a bolt 8 inserted in the other part (6). The part 5 is overmoulded onto the nut 7 and an access channel 9 is provided in it to enable the bolt 8 to reach the nut. A channel 10 passes axially through the part 6, facing the access channel, and comprises two sections of different diameter which join at a shoulder 11 against which the head 8A of the bolt bears. A plug 12 is force fitted into the larger diameter section to isolate the bolt in a fluid-tight way from the exterior.

The parts 5 and 6 each constitute one of the end portions 4A or 4C and conjointly form the central portion 4B.

A radially magnetised annular permanent magnet 13 is inserted into an annular groove 14 formed axially in the part 6 from the mating surface of the two parts: it is therefore removable. This magnet is substantially halfway along the length of the scraper.

A sleeve 15 is disposed around the central portion 4B, axially between the wear segments 2 and 3.

The end portions 4A and 4C are frustoconical and have substantially plane end surfaces. The sleeve 15 is diabolo-shaped and has a cylindrical internal surface and a concave external surface. The wear rings project radially from the portions 4A, 4B and 4C and the sleeve 15 constitutes between these rings, with the central portion 4B, a thinner central portion.

In the embodiments of FIGS. 2 through 6 the wear segments are fastened to the sleeve disposed on the central portion.

Thus in FIGS. 2 and 3, which show a scraper 1' similar to that from FIG. 1 with the same reference characters as FIG. 1 except they are "primed", the wear segments 2' and 3' are part of the sleeve 15' the concave external surface of which they flank axially. The sleeve 15' further comprises, projecting axially on each of its transverse flanks bordering the wear segments 2' and 3', a rib 20 designed to penetrate into the end portions 4'A and 4'C.

In the example shown in FIGS. 2 and 3 a groove 21 is formed radially in the wear segments 2'and 3'.

The magnet 13' is positioned in the radial direction only by its external wall and defines internally an empty space. A sleeve 18 forms a spacer between the nut and the head of the bolt.

In the simplified version of FIG. 4, comparable with FIG. 1, this groove is eliminated and the wear segments 2A and 3A are smooth (the reference characters are the same as in FIG. 3 except the suffix "A" replaces the "prime").

In the FIG. 5 variant (comparable with that of FIG. 4 with the reference characters "primed") the wear segments 2A' and 3A' comprise a radially projecting bead 19 flanked by two bevels, namely a bevel 22 on the side of the end portions which is frustoconical and a rounded bevel 23 with a constant radius of curvature along the circumference of the segment.

In the FIG. 6 variant (comparable with FIG. 3 with the reference characters "double-primed" instead of "primed") each wear segment 2" has two radially projecting annular beads 24 and 25 forming scraper lips separated by a groove 26.

In the FIG. 7 variant (comparable with FIG. 3 with the "primed" reference characters replaced by the same characters with the suffix "B") the wear segments 2B and 3B include cylindrical slots 30 and 31 discharging axially towards each other so as to form cylindrical scraper lips bordered by chamfers.

FIG. 8 shows a number of scrapers of the FIG. 1 type at various points in a pipe 100 with a constant internal diameter d. Only part of the pipe is shown.

In this pipe is a three-way valve 40 (of the type described in another patent application filed this day) and a bend 50 the average radius of curvature R1 of which is approximately equal to d (this is the smallest value of the radius of curvature encountered in practice in pipe installations).

In practice the diameter of the wear segments when unstressed is slightly greater than d so that insertion of the scraper into the pipe results in radial compression of a few percent (up to 5%, usually about 2–3%) so that the interior wall of the pipe is properly scraped by the applied rubbing movement in translation.

$L_e$ is the length of the frustoconical end portions of the scraper and $\alpha$ is their half-angle at the apex; these magnitudes are chosen so that in the bend 50 the edge 60 of the flat side of one of the frustoconical end portions contacts the interior of the bend so as to guide the scraper as it pivots. This length $L_e$ is advantageously equal to one-half the longitudinal dimension H of the opening 43 through which the main section 41 of the valve 40 communicates with its branch section 42. The angle $\alpha$ is advantageously chosen to secure effective deflection of the liquid circulating from the branch section 42 into the pipe 100 (assuming that the scraper situated to the left of the valve 40 is removed) without impeding this flow.

The length $L_m$ between the two end portions is advantageously chosen so that in the bend 50 the segments remain compressed so that they can perform the scraping in a satisfactory way. The radius of curvature r of the thinner central portion is less than the minimal radius $r_1$ of the bend 50 and therefore less than d/2; this is to avoid jamming in the bend.

As a result the following ranges of dimensions are preferred and advantageously all apply simultaneously to achieve the aforementioned optimum (taking D equal to the diameter of the segments in the uncompressed state: D/d is therefore usually between about 1.02 and 1.05):

$\alpha$ is approximately $\pi/8$ (between 20° and 25°); this angle is preferably at least 20°;

$L_e/D$ is between approximately 0.35 and 0.45;

$L_m/D$ is between approximately 0.75 and 0.85;

the distance between the segments is approximately r;

L/D is between approximately 1.55 and 1.66;

r/D is between approximately 0.40 and 0.50;

the angle $\theta$ subtended by the thinner portion is between 50° and 70°, preferably in the vicinity of $\pi/3$.

To give a specific example, for a diameter d of 102 mm (approximately 4") the following values are chosen:

L=170 mm $L_e$=45 mm $L_m$=80 mm $\alpha$=23° r=50 mm e=15 mm (thickness of segments)

FIG. 2 shows an example of a much larger value for $\alpha$ (45°).

The wear segments (and the intermediate sleeve 15 or 15') are advantageously made from polyurethane with a SHORE A hardness between 60 and 90 and the body itself is, for example, made from polyurethane with a SHORE A hardness between 65 and 80, in other words it can be either less than or greater than that of the segments.

The segments 2A, 3A, 2A', 3A' of FIGS. 4 and 5 are particularly well suited to pipes with broad tolerances for the internal diameter (±3 mm) and their SHORE A hardness is between 60 (FIG. 4) and 65 (FIG 5): the quality of scraping is average and the durability of the scraper segments is low.

For moderate tolerances (±2 mm) the segments 2', 3', 2", 3" of FIGS. 3 and 6 are preferred with a SHORE A hardness of about 80: the quality of scraping is good and the durability of the segments is moderate.

Finally, for close tolerances (±1 mm) on the internal diameter of the pipe considered the segments 2B, 3B of FIG. 7 are preferred with SHORE A hardness of about 90: the resulting scraping is excellent and the segments have excellent durability.

It goes without saying that the shape of the segments from FIGS. 2 through 7 can also be used in the scraper from FIG. 1 with the segments separated by a separate sleeve.

It will be realised that these various shapes correspond to different compromises between the contradictory requirements for resistance to wear and radial deformability: FIGS. 4 and 5 correspond to deformability in compression, FIGS. 3 and 6 propose two stages of compression (initially only the ribs are compressed radially, spreading laterally) and FIG. 7 corresponds to deformability through radial bending of the lips.

It will be understood that the transverse plane surfaces delimiting these end portions offer a large contact area when one scraper butts up against another, which reduces the risks of wear in the event of impacts when they come into contact.

The magnet 13 makes it possible to locate the position of the scraper in the pipe.

It is obvious that the preceding description has been given by way of non-limiting example only and that numerous variations thereon may be proposed by those skilled in the art without departing from the scope of the invention.

I claim:

1. A bidirectional scraper for a liquid distribution pipe, comprising an assembly including:
   a) an elongated body defined by two complementary parts forming end portions and a reduced cross-section central portion;
   b) a pair of removable wear segments surrounding and mounted on the reduced central portion, one segment adjacent one end portion and the other segment adjacent the other end portion; and
   c) fastening means releasably connecting together the body parts and the wear segments, said fastening means comprising a nut fastened to one of the body parts and a bolt extending through and retained by the other body part.

2. Scraper according to claim 1 characterised in that the wear segments are annular and held apart from each other by a separate sleeve disposed around the central portion.

3. Scraper according to claim 1 characterised in that the wear segments are fastened to a sleeve disposed around the central portion.

4. Scraper according to claim 1 characterised in that the wear segments incorporate a centering rib axially facing the end portions, and means cooperating with said rib to provide for centering said wear segments with respect to said end portions.

5. Scraper according to claim 1 characterised in that the removable wear segments have a smooth radially external surface.

6. Scraper according to claim 1 characterised in that the removable wear segments incorporate a bead projecting radially outwards flanked by two bevels.

7. Scraper according to claim 1 characterised in that the wear segments incorporate an annular groove open radially outwards.

8. Scraper according to claim 7 characterised in that the groove separates two beads forming scraper lips.

9. Scraper according to claim 1 characterised in that the segments incorporate cylindrical slots facing axially towards each other.

10. Scraper according to claim 1 characterised in that the end portions are frustoconical.

11. Scraper according to claim 10 characterised in that the frustoconical surfaces of the end portions reside at an angle $\alpha$ of between 20° and 25°.

12. Scraper according to claim 10 characterised in that the frustoconical portions have a length $L_e$ between 35% and 45% of the diameter D of the wear segments.

13. Scraper according to claim 10 characterised in that the frustoconical portions are spaced apart a distance $L_e$ that is substantially between 0.75 and 0.85 times the diameter D of the wear segments.

14. Scraper according to claim 10 characterised in that the scraper has a length L that is substantially between 1.55 and 1.6 times the diameter D of the wear segments.

15. Scraper according to claim 10 characterised in that the central portion has a radius of curvature r between 0.40 and 0.50 times the diameter D of the wear segments.

16. Scraper according to claim 1 characterised in that the nut and the bolt are isolated in a fluid-tight way from the exterior of said scraper.

17. Scraper according to claim 1 characterised in that the scraper includes a radially magnetised annular permanent magnet.

18. Scraper according to claim 17 characterised in that the scraper includes an annulus that is removably mounted in one of the complementary parts.

* * * * *